: 
(12) United States Patent
Tsubone et al.

(10) Patent No.: US 8,647,420 B2
(45) Date of Patent: Feb. 11, 2014

(54) SYSTEM AND METHOD FOR RECOVERING CARBON DIOXIDE FROM FLUE GAS

(75) Inventors: Hiroshi Tsubone, Kanagawa (JP); Toyoshi Nakagawa, Tokyo (JP); Takashi Kamijo, Tokyo (JP); Tsuyoshi Oishi, Tokyo (JP); Katsufumi Inoue, Kanagawa (JP); Osamu Miyamoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 384 days.

(21) Appl. No.: 13/081,925

(22) Filed: Apr. 7, 2011

(65) Prior Publication Data

US 2011/0250120 A1 Oct. 13, 2011

(30) Foreign Application Priority Data

Apr. 8, 2010 (JP) ................................ 2010-089636

(51) Int. Cl.
*B01D 53/14* (2006.01)

(52) U.S. Cl.
USPC ............... 96/242; 95/183; 95/193; 95/209; 95/236; 202/183; 202/184; 202/185.1; 203/41; 203/42

(58) Field of Classification Search
USPC ............... 202/183, 184, 185.1; 203/41, 42; 423/220, 437.1; 96/236
See application file for complete search history.

(56) References Cited

U.S. PATENT DOCUMENTS 2,849,386 A * 8/1958 Gilmore et al. ............... 202/153
5,334,291 A * 8/1994 Gavlin et al. .................. 202/234

(Continued)

FOREIGN PATENT DOCUMENTS

JP 30-8713 B1 11/1955
JP 38-16101 B1 2/1956

(Continued)

OTHER PUBLICATIONS

European Search Report dated Jul. 8, 2011, issued in corresponding European Patent Application No. 11161574.6.

(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

[Problem] To provide a system for recovering carbon dioxide from flue gas, in which a reboiler in a regenerator can be compactly installed, and a method therefor, in facilities where $CO_2$ or the like contained in flue gas is recovered.
[Solving Means] To include an absorber 1006 that absorbs $CO_2$ contained in flue gas 1002, a regenerator 1008 that strips $CO_2$ from $CO_2$ absorbent (rich solution) 1007 to regenerate absorbent, internal shells 101 provided at a bottom of the regenerator 1008 with a predetermined interval therebetween, into which regenerated $CO_2$ absorbent is introduced by a feeding unit 102 from a bottom side thereof so that the $CO_2$ absorbent overflows from an upper end of the internal shell thereof toward the bottom of the regenerator, and a reboiler that is inserted into the internal shells 101 in a direction orthogonal to a vertical axis and includes a heat-transfer tube 103 that reboils absorbent. Steam separated from $CO_2$ absorbent reboiled by the heat-transfer tube 103 is transferred to an upper part of a regenerator, condensed absorbent is caused to overflow from an upper end of the internal shell and to be discharged from a bottom side of a regenerator, and the absorbent is fed to the absorber 1006 as regenerated $CO_2$ absorbent (lean solution) 1009.

4 Claims, 7 Drawing Sheets

(56) References Cited

U.S. PATENT DOCUMENTS

2009/0101868 A1    4/2009    Zhang et al.
2011/0107916 A1*    5/2011    Inoue et al. .................... 96/242

FOREIGN PATENT DOCUMENTS

| | | |
|---|---|---|
| JP | 36-16713 B1 | 1/1959 |
| JP | 57-190238 U | 12/1982 |
| JP | 60-131817 A | 7/1985 |
| JP | 6-091134 A | 4/1994 |
| JP | 2003-053134 A | 2/2003 |
| JP | 2010-022986 A | 2/2010 |

OTHER PUBLICATIONS

Official Communication under Rule 71l(3)EPC issued Apr. 24, 2012 in corresponding European Patent Application No. 11 161 574.6.

Notice of Allowance dated Jul. 30, 2013 issued in corresponding Japanese Application No. 2010-089636 with English Translation. (4 pages).

* cited by examiner

SYSTEM AND METHOD FOR RECOVERING CARBON DIOXIDE FROM FLUE GAS

TECHNICAL FIELD

The present invention relates to a system for recovering carbon dioxide from flue gas, in which a reboiler in a regenerator can be compactly installed, and to a method therefor.

BACKGROUND ART

Greenhouse effect due to $CO_2$ has been pointed out as a cause of global warming in recent years, and a measure against it has become an urgent issue internationally for protecting the global environment. Generation sources of $CO_2$ include all sorts of human activity areas that burn fossil fuel, and demands for the reduction of discharge thereof are further increasing. Accompanying this trend, a method of removing and recovering $CO_2$ in combustion flue gas by bringing combustion flue gas in a boiler into contact with amine $CO_2$ absorbent, and a method of storing recovered $CO_2$ without discharging it to the air have been strenuously researched, with regard to power generation facilities such as a thermal power plant that uses a large amount of fossil fuel.

As a process of eliminating and recovering $CO_2$ in combustion flue gas by using the amine system $CO_2$ absorbent, a process in which combustion flue gas is brought into contact with the $CO_2$ absorbent in an absorber, and a process in which the absorbent having absorbed $CO_2$ is heated in a regenerator to release $CO_2$ and regenerate the absorbent so that the absorbent is circulated and reused in the absorber have been adopted (see, for example, Patent Documents 1 and 2).

FIG. 6 is a schematic diagram of a system for recovering carbon dioxide from flue gas according to a conventional technique. FIG. 7 is a pattern diagram of a site area of the reboiler shown in FIG. 6. As shown in FIG. 6, a conventional $CO_2$ recovering system 1000 has such a configuration that flue gas 1002 containing $CO_2$ exhausted from industrial facilities 1001 such as a boiler and a gas turbine is cooled by cooling water 1003 in a cooling column 1004, and the cooled flue gas 1002 containing the $CO_2$ is brought into countercurrent contact with $CO_2$ absorbent containing alkanolamine as a base (amine solution) in an absorber 1006, with $CO_2$ in the flue gas 1002 being absorbed by the $CO_2$ absorbent, thereby eliminating $CO_2$ from the flue gas 1002. The $CO_2$ absorbent having absorbed $CO_2$ (rich solution) 1007 releases $CO_2$ in a regenerator 1008, so that most of $CO_2$ is removed until reaching a bottom part of the regenerator 1008, to regenerate the absorbent as lean solution 1009. The regenerated lean solution 1009 is fed again to the absorber 1006 as the $CO_2$ absorbent (amine solution) and reused.

In FIG. 6, reference letter or numeral 1001a denotes a flue gas duct of a boiler, a gas turbine or the like, 1010b denotes a stack having a damper therein, 1010 denotes a blower that feeds flue gas, 1011 denotes purged gas in which $CO_2$ has been removed, 1012 denotes a feed pump for the rich solution 1007 provided on a first feed line $L_1$, 1013 denotes a heat exchanger that heat-exchanges the rich solution 1007 with the lean solution 1009, $L_3$ denotes a $CO_2$ discharge line, 1016 denotes a condenser that condenses water vapor, 1017 denotes a separation drum that separates carbon dioxide ($CO_2$) 1018, 1019 denotes a pump for returning reflux water entrained after $CO_2$ removal to the regenerator 1008, 1020 denotes a pump provided on a second feed line $L_2$ to feed the lean solution 1009, and 1021 denotes a cooling system that cools the lean solution 1009.

The carbon dioxide ($CO_2$) recovered is compressed by a $CO_2$ compressor 1022, thereby acquiring high-pressure $CO_2$ 1023 of 10.0 to 15.0 megapascals (G). The $CO_2$ recovering system can be provided afterwards for recovering $CO_2$ from an existing flue gas source, or can be provided at the same time of newly installing a flue gas source.

A reboiler for evaporating a part of the extracted amine solution is installed at the bottom area of the regenerator 1008. The evaporated equilibrium vapor becomes stripping vapor for giving energy for amine-$CO_2$ dissociation. Because the amine solution for absorbing $CO_2$ is not tolerant to heat and is decomposed at a high temperature, although a high temperature is desired in view of stripping performance. Therefore, the regenerator 1008 operated at a temperature as low as possible, taking thermal decomposition into consideration. A reboiler heat source is also limited up to 150C. In view of avoiding decomposition, it is preferred that a contact time of the amine solution with the heat source is as short as possible.

As a type of the reboiler, a horizontal thermo-siphon reboiler and a kettle-type reboiler have been conventionally used.

In FIG. 6, an example of using a horizontal thermo-siphon reboiler 1030 is shown. The horizontal thermo-siphon reboiler 1030 has a heat-transfer tube 1032 to which low-pressure steam 1031 is fed. The heat-transfer tube 1032 heats regenerated $CO_2$ absorbent (amine solution) 1033 extracted from the regenerator 1008, separates carbon dioxide having remained therein, and returns it to the inside of the regenerator 1008 as gas-liquid two phase flow 1034. Reference numeral 1035 denotes condensed water.

The thermo-siphon reboiler 1030 is normally used as a reboiler of a distillation column. However, evaporated steam and liquid become the gas-liquid two phase flow 1034 in a mixed phase, which passes in the heat exchanger and through an outlet piping.

CITATION LIST

Patent Literature

[PTL 1] JP H06-91134A
[PTL 2] JP 3716195

SUMMARY OF INVENTION

Technical Problem

As an effective use of carbon dioxide in flue gas, conventionally, apart of carbon dioxide in the flue gas is only recovered to produce carbon dioxide for carbonated drink and dry ice. Recently, however, a greenhouse effect due to carbon dioxide has been pointed out as a cause of global warming, and a measure against it becomes imperative internationally for protecting global environment, and generation sources of carbon dioxide include all sorts of human activity areas that burn fossil fuel, and demands for reduction of discharge thereof are further increasing. Accompanying this trend, a method of removing and recovering the entire amount of $CO_2$ in combustion flue gas by bringing combustion flue gas in industrial facilities such as a boiler and a gas turbine into contact with $CO_2$ absorbent, and a method of compressing and storing recovered $CO_2$ without discharging it to the air have been tested, with regard to power generation facilities such as a thermal power plant that uses a large amount of fossil fuel, and a technique for recovering carbon dioxide having high energy efficiency of the entire system has been eagerly desired.

Further, conventionally, use of carbon dioxide means production of dry ice and the like, and the production thereof can be realized sufficiently by using the horizontal thermo-siphon reboiler and the kettle-type reboiler. However, there are following problems when a large amount of carbon dioxide in large facilities is recovered, compressed, and stored.

For example, in a system in which 110-MW power generation facilities are used, when exhausted carbon dioxide is to be recovered, plural (at least four) reboilers need to be appropriately arranged around the regenerator 1008, to maintain reboiler performance. However, if the $CO_2$ recovering system becomes larger, the size of the reboilers also become larger, and thus a very large installation area (250 m$^2$) is required.

Further, at the time of maintenance of the horizontal thermo-siphon reboiler 1030, at the time of inspection, and at the time of cleaning when outside of the heat-transfer tube 1032 adhere scale, as shown in FIG. 7, when four thermo-siphon reboilers 1030A to 1030D are installed, a heavy tube bundle of the four heat-transfer tubes 1032A to 1032D (about 30 to 80 tons/tube) needs to be extracted, and extraction of the tube bundle becomes more difficult with an increase in the reboiler size. In FIG. 7, reference letter or numeral 1030a to 1030c respectively denote an connecting part of a piping for feeding the gas-liquid two phase flow 1034 to the regenerator 1008.

That is, for example, in the case of a $CO_2$ recovering apparatus in 110-MWe power generating facilities, for example, 1800 tubes per one regenerator are required, and in a maintenance operation, extraction work becomes difficult due to the heavy weight. Further, deflection at the time of extracting a tube bundle of, for example, about 12 meters becomes a problem.

Further, at the time of pulling out the tube bundle, a maintenance site for a pulling-out operation (more than double the installation area) is required. That is, a total area $S_3$ (500 m$^2$) of a site area $S_1$ (250 m$^2$) for installation and a maintenance site area $S_2$ (250 m$^2$) is required, and when there is no large spare space in the site, installation of a $CO_2$ recovering system becomes difficult in existing large boiler facilities.

The present invention has been achieved in view of the above problems, and an object of the present invention is to provide a system for recovering carbon dioxide from flue gas, in which a reboiler in a regenerator can be compactly installed, and a method therefor, in facilities where $CO_2$ or the like contained in flue gas is recovered.

Solution to Problem

According to an aspect of the present invention, a system for recovering carbon dioxide from flue gas includes: an absorber that brings $CO_2$ absorbent that absorbs $CO_2$ contained in flue gas discharged from a boiler plant into contact with the flue gas to remove $CO_2$ from the flue gas; a regenerator that strips $CO_2$ from $CO_2$ absorbent that is fed from the absorber and has absorbed the $CO_2$ to regenerate the $CO_2$ absorbent; a plurality of internal shells provided at a bottom of the regenerator with a predetermined interval therebetween, into which regenerated $CO_2$ absorbent is introduced by a feeding unit from a bottom side thereof so that the $CO_2$ absorbent overflows from an upper opening thereof toward the bottom of the regenerator; and a reboiler that is inserted into the internal shell in a direction orthogonal to a vertical axis and includes a heat-transfer tube that reboils $CO_2$ absorbent. The system transfers steam separated from $CO_2$ absorbent reboiled by the heat-transfer tube to an upper part of a regenerator, and the system causes condensed $CO_2$ absorbent to overflow from an upper end of the internal shell and to be discharged from a bottom side of a regenerator, and feeds the $CO_2$ absorbent to an absorber side as regenerated $CO_2$ absorbent.

Advantageously, in the system for recovering carbon dioxide from flue gas, two or more of the reboilers are inserted alternatively from right and left.

Advantageously, in the system for recovering carbon dioxide from flue gas, the heat-transfer tube bundle is provided with a reinforcement member.

Advantageously, in the system for recovering carbon dioxide from flue gas, the heat-transfer tube is constituted by a tube bundle having a rectangular shape in cross section.

According to another aspect of the present invention, a method for recovering carbon dioxide from flue gas for a system including an absorber that brings $CO_2$ absorbent that absorbs $CO_2$ contained in flue gas discharged from a boiler plant or the like into contact with the flue gas to remove $CO_2$ from the flue gas, and a regenerator that strips $CO_2$ from $CO_2$ absorbent that is fed from the absorber and has absorbed the $CO_2$ to regenerate the $CO_2$ absorbent, includes: introducing regenerated $CO_2$ absorbent into a plurality of internal shells at a bottom of the regenerator; reboiling the accumulated $CO_2$ absorbent by a heat-transfer tube; generating steam by heating and boiling regenerated $CO_2$ absorbent; striping $CO_2$ having remained slightly; and temporarily accumulating $CO_2$ absorbent condensed by stripping steam and residual $CO_2$ and by overflowing from an upper end of the internal shell and falling down toward a bottom side of a regenerator; reusing the accumulated $CO_2$ absorbent for absorption of $CO_2$ by extracting from a bottom outlet and feeding to an absorber side.

Advantageous Effects of Invention

According to the present invention, internal shells are provided at the bottom of a regenerator, and a reboiler including a heat-transfer tube that reboils $CO_2$ absorbent is inserted into the internal shell. Therefore, a simplified reboiling system incorporated in a regenerator constituting a series of reboiling cycles, which can transfer steam separated from the $CO_2$ absorbent reboiled by the heat-transfer tube to an upper part of the regenerator, cause the condensed $CO_2$ absorbent to overflow from an upper end of the internal shell and be discharged from the bottom of the regenerator, and feed the $CO_2$ absorbent to the absorber as regenerated $CO_2$ absorbent (lean solution), can be established.

DESCRIPTION OF EMBODIMENTS

The present invention is explained below in detail with reference to the accompanying drawings. The present invention is not limited to the embodiments. In addition, constituent elements in the following embodiments include those that can be easily assumed by persons skilled in the art or that are substantially equivalent.

[Embodiment]

Figure 1:
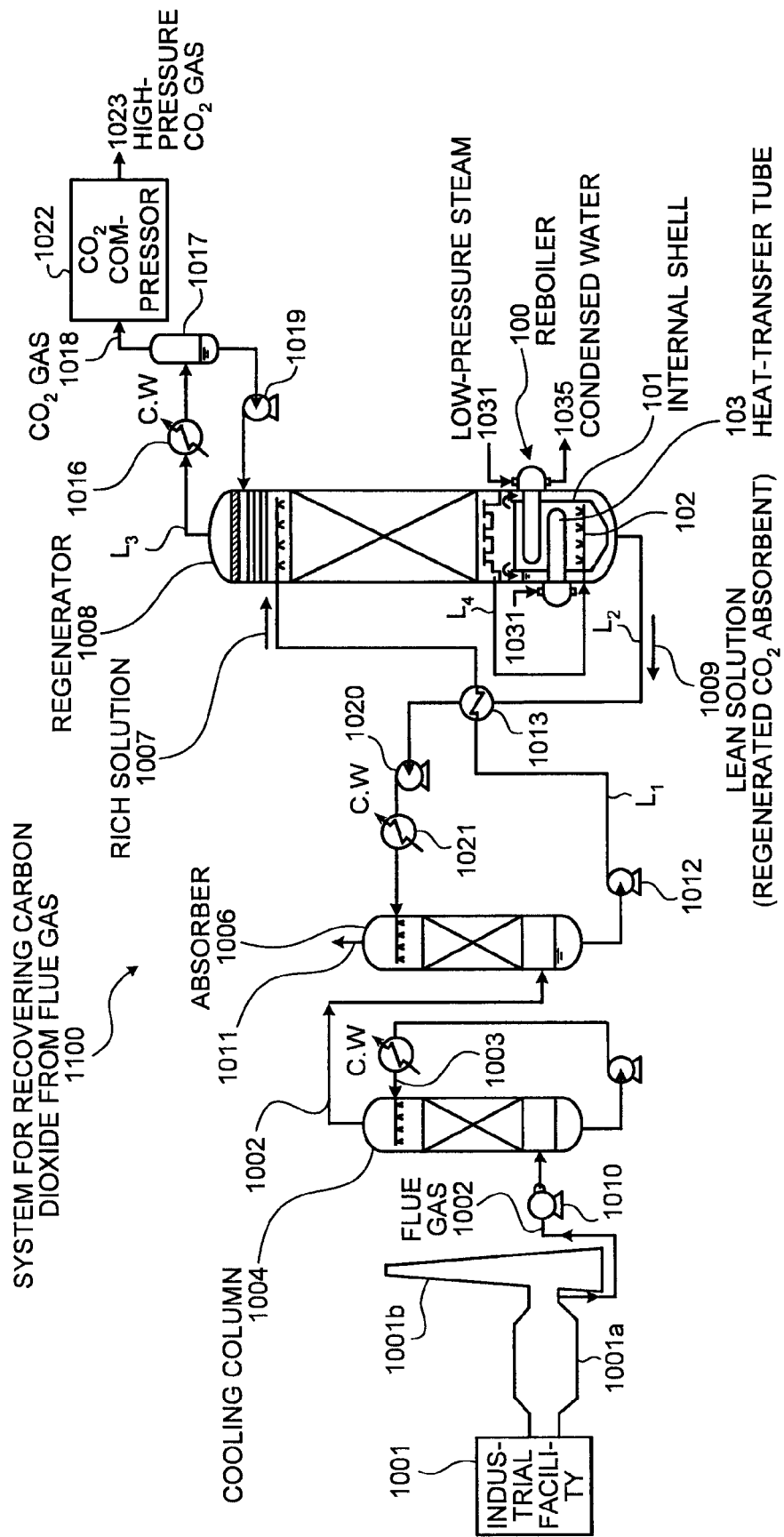
FIG. 1 is a schematic diagram of a system for recovering carbon dioxide from flue gas according to an embodiment of the present invention.
Figure 2:
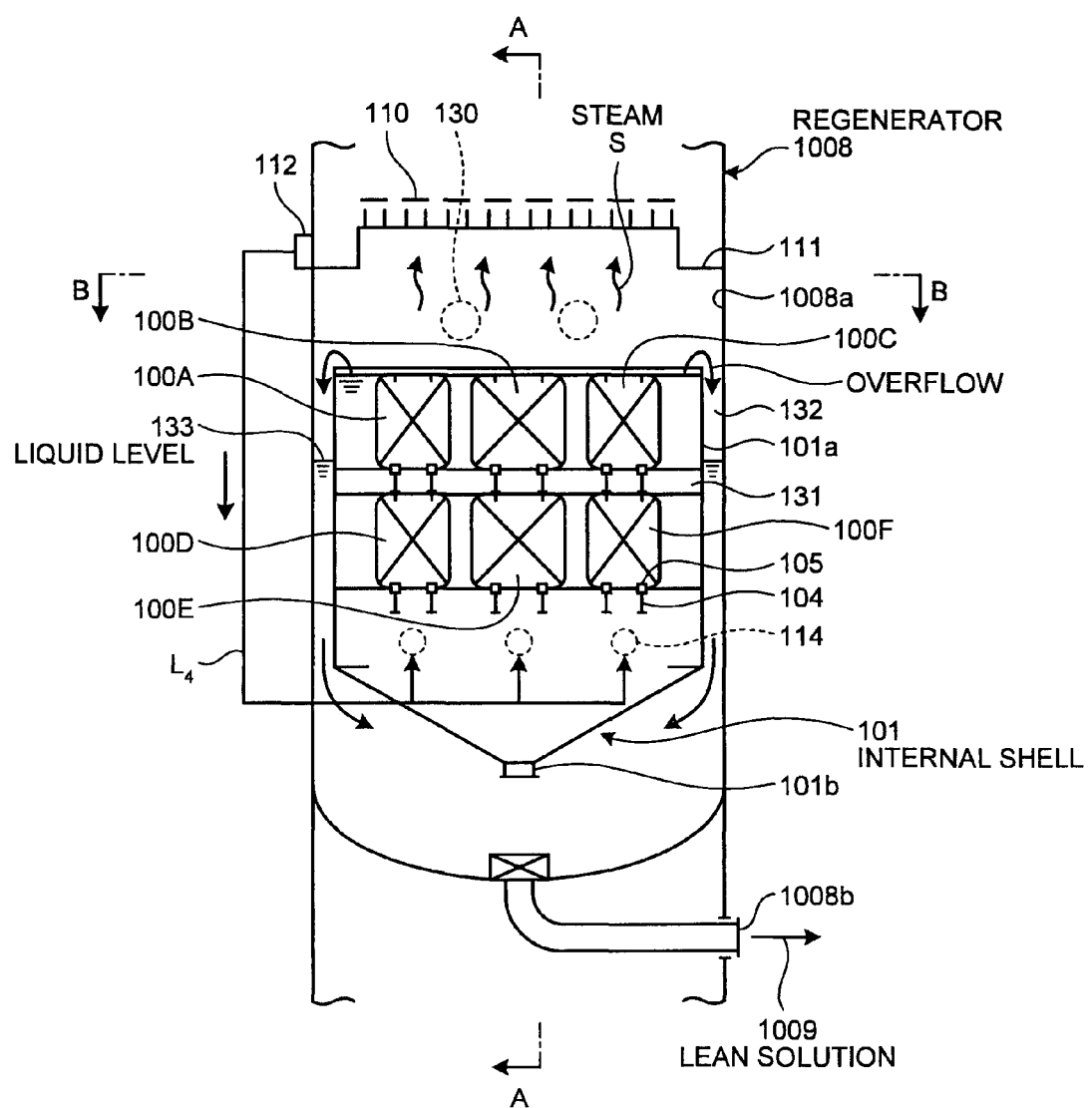
FIG. 2 is a pattern diagram of relevant parts of a regenerator in the system for recovering carbon dioxide.
Figure 3:
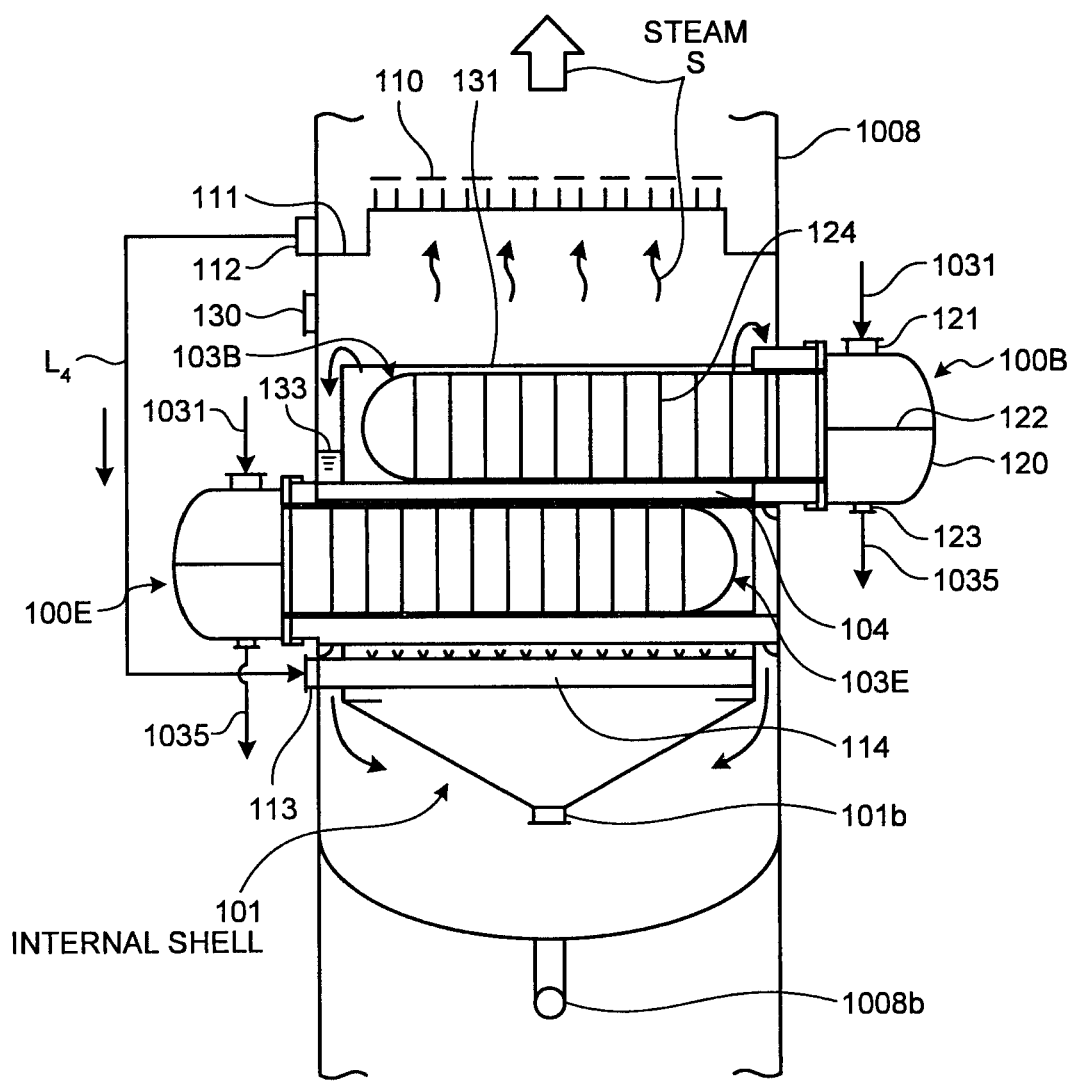
FIG. 3 is a view on an arrow A-A of FIG. 2.
Figure 4:
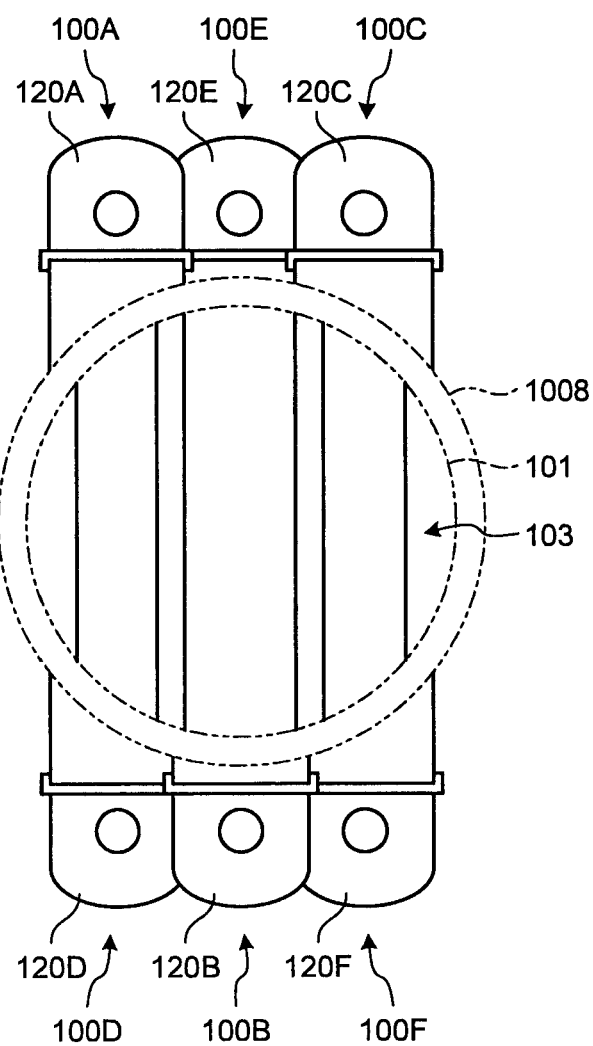
FIG. 4 is a view on an arrow B-B of FIG. 2.
Figure 5:
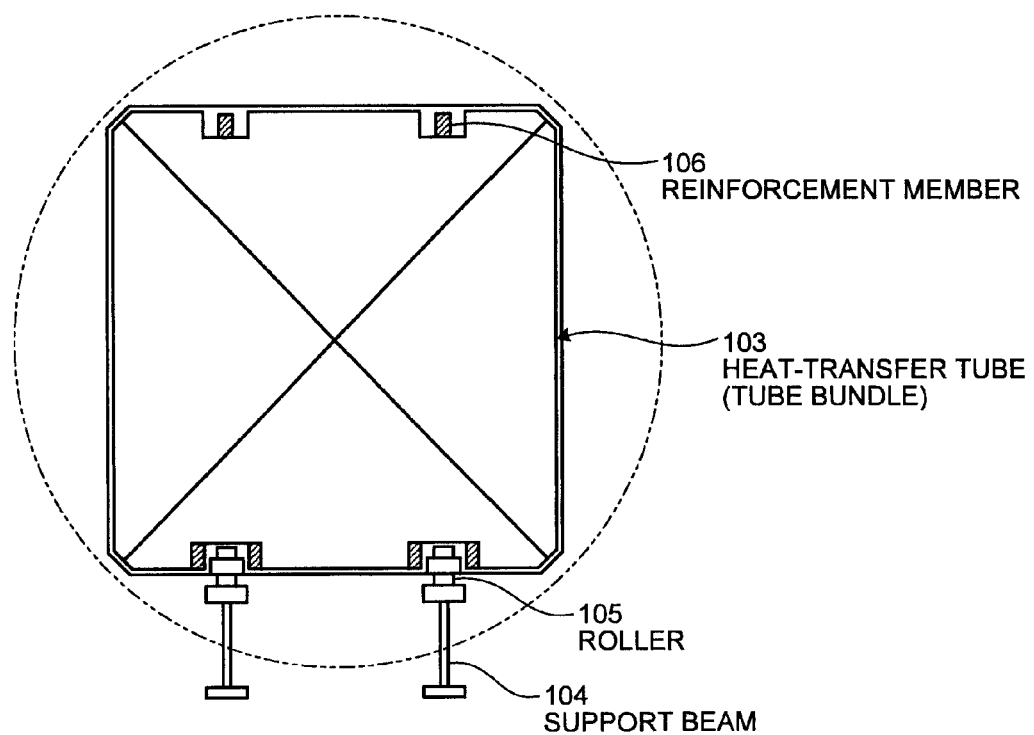
FIG. 5 is a schematic diagram of a tube bundle of heat-transfer tubes.
Figure 6:
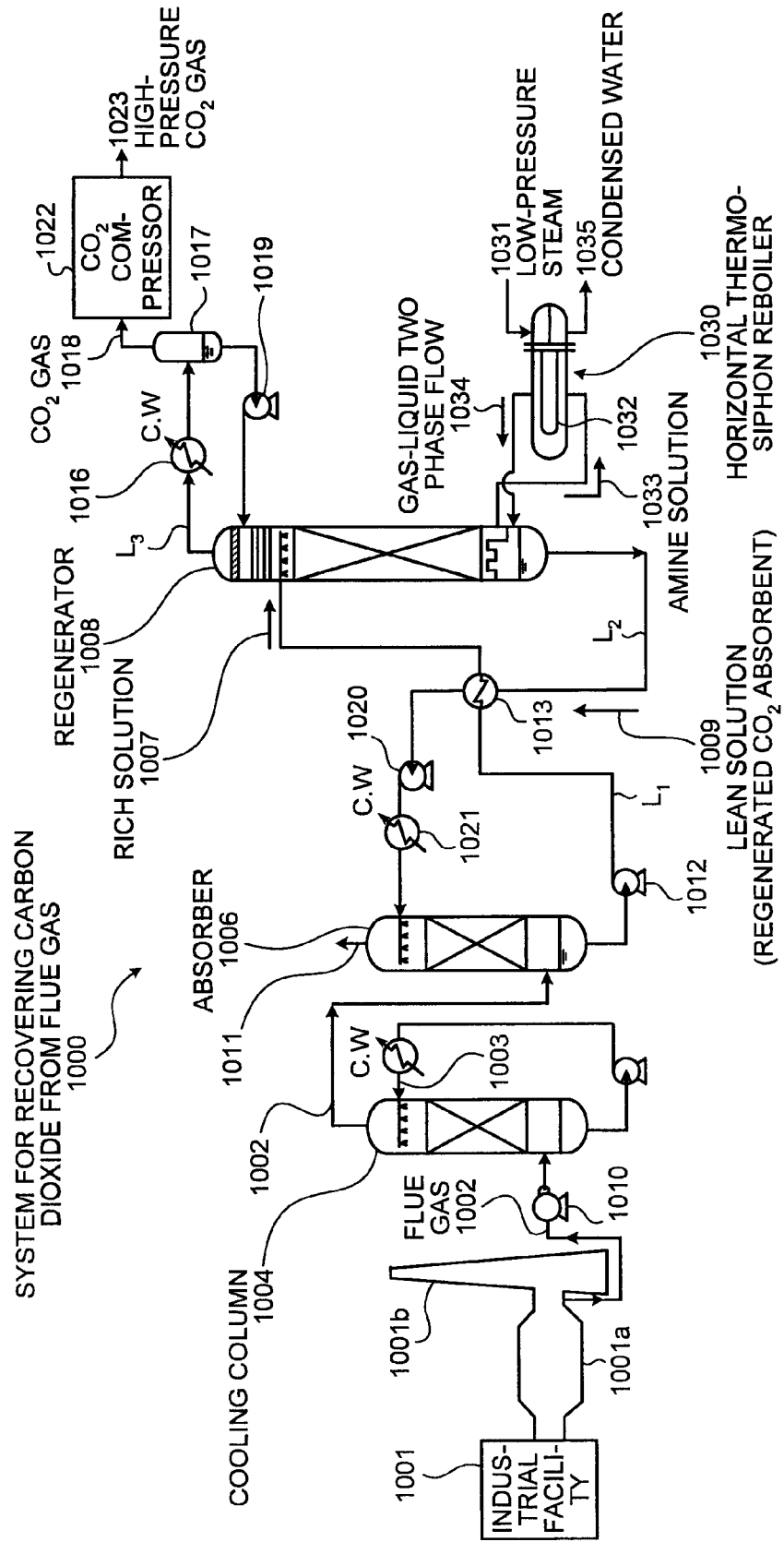
FIG. 6 is a schematic diagram of a system for recovering carbon dioxide from flue gas according to a conventional technique.

A system for recovering carbon dioxide from flue gas according to an embodiment of the present invention is explained with reference to the drawings. FIG. 1 is a schematic diagram of the system for recovering carbon dioxide from flue gas. FIG. 2 is a pattern diagram of relevant parts of a regenerator in the system for recovering carbon dioxide. FIG. 3 is a view on an arrow A-A of FIG. 2. FIG. 4 is a view on an arrow B-B of FIG. 2. FIG. 5 is a schematic diagram of a tube bundle of heat-transfer tubes. Like reference letters or numerals refer to like parts of the system for recovering carbon dioxide from flue gas shown in FIG. 6, and explanations thereof will be omitted. As shown in FIG. 1, a system for recovering carbon dioxide from flue gas 1100 includes an absorber 1006 that brings $CO_2$ absorbent that absorbs $CO_2$ contained in flue gas 1002 discharged from industrial facilities 1001 such as a boiler or a gas turbine into contact with the flue gas 1002 to remove $CO_2$ from the flue gas 1002, the regenerator 1008 that strips $CO_2$ from the $CO_2$ absorbent (rich solution) 1007, which is fed from the absorber 1006 and has absorbed $CO_2$, to regenerate the $CO_2$ absorbent, internal shells 101 provided at a bottom of the regenerator 1008 with a predetermined interval therebetween, into which the regenerated $CO_2$ absorbent is introduced by a feeding unit 102 from a bottom side thereof so that the $CO_2$ absorbent overflows from an upper end of the internal shell thereof toward the bottom of the regenerator, and a reboiler 100 inserted into the internal shell 101 in a direction orthogonal to a vertical axis and including a heat-transfer tube 103 that reboils the $CO_2$ absorbent. The system for recovering carbon dioxide from flue gas 1100 transfers steam separated from the $CO_2$ absorbent reboiled by the heat-transfer tube 103 to an upper part of the regenerator, causes the condensed $CO_2$ absorbent to overflow from an upper end of the internal shell and be discharged from the bottom of the regenerator, and feeds the $CO_2$ absorbent to the absorber 1006 as the regenerated $CO_2$ absorbent (lean solution) 1009.

In the present invention, the heat-transfer tube (a tube bundle that bundles a plurality of U-shaped heat-transfer tubes is not shown) 103 constituting a reboiler system is directly inserted into the internal shell 101 provided in the regenerator 1008, thereby considerably simplifying a feed piping of the absorbent and omitting a piping on a steam generator side. The U-shaped heat-transfer tubes 103 are bundled to form a tube bundle. In FIG. 3, reference numeral 124 denotes a support plate (cross baffle) for the tube bundle. When the U-shaped heat-transfer tubes that constitute the heat-transfer tube 103 are to be cleaned, a maintenance worker directly enters into the regenerator 1008 from a manhole 130 to clean the heat-transfer tube without extracting the heat-transfer tube 103 formed of the U-shaped heat-transfer tubes. The heat-transfer tubes in the present embodiment are arranged in a rectangular pitch array to facilitate cleaning. However, a triangular pitch array can be used to give priority to heat transfer efficiency.

In the present embodiment, as shown in FIG. 2, reboilers 100A to 100F are provided in lateral three rows and vertical two stages, in total six, on the lower side of the regenerator 1008. As shown in FIGS. 2 to 5, the heat-transfer tube is constituted by a tube bundle having a rectangular shape in cross section. As shown in FIG. 3, the reboilers 100B and 100E respectively including the heat-transfer tubes 103B and 103E are inserted alternatively from right and left so as to realize efficient arrangement with a minimum effective area. The reboilers 100B and 100E including the heat-transfer tubes 103B and 103E, respectively, have a larger capacity than that of the reboilers 100A, 100C, 100D, and 100F including other heat-transfer tubes. The size of heat-transfer tubes in vertical two stages is made the same.

Specifically, the reboiler 100B is on the upper stage and is inserted from the right in FIG. 3, and the reboiler 100E is on the lower stage and is inserted from the left in FIG. 3. As shown in FIG. 4, the reboilers are arranged so that channels 120A to 120F of the adjacent reboilers 100A to 100F do not hit each other. The channels 120A to 120F have a cylindrical shape because the channels 120A to 120F introduce the low-pressure steam 1031.

In the present embodiment, the internal shell 101 is provided inside the regenerator 1008, and the heat-transfer tube 103 constituting the rectangular tube bundle is inserted into the internal shell 101 in the regenerator 1008 to be soaked in the $CO_2$ absorbent filled in the internal shell 101. As shown in FIGS. 2, 3, and 5, the heat-transfer tube 103 is horizontally held by a support beam 104. A roller 105 is provided at the bottom of the tube bundle including the heat-transfer tube 103 to facilitate workability at the time of installation and replacement of a tube bundle. A reinforcement member 106 is provided in the tube bundle in a longitudinal direction of the tube to prevent deflection of the tube bundle.

Regeneration of the rich solution 1007 by using the regenerator 1008 including the internal shells 101 is performed in the following manner. Hereinafter, the reboilers 100A to 100F are referred to as a reboiler 100, the heat-transfer tubes 103A to 103F are referred to as a heat-transfer tube 103, and the channels 120A to 120F are referred to as a channel 120. First, the rich solution 1007 in which $CO_2$ has been absorbed by the absorber 1006 is introduced from the top of the regenerator 1008, comes in contact with steam at the time of falling down in the regenerator 1008 so that $CO_2$ is separated and discharged from the top of the regenerator 1008 to regenerate the $CO_2$ absorbent. The $CO_2$ absorbent regenerated during falling down in the regenerator 1008 is then collected, as shown in FIGS. 2 and 3, in a seal pan 111 from on a chimney tray 110. The whole regenerated $CO_2$ absorbent enters into an absorbent inlet nozzle 113 via a feed line $L_4$ from an absorbent outlet nozzle 112, and is fed evenly into the internal shell 101 of the heat-transfer tube 103 from absorbent feed headers 114 constituting the feeding unit 102 of the $CO_2$ absorbent to fill the internal shell 101. In the present embodiment, the feed line $L_4$ is provided outside of the regenerator 1008; however, in the present invention, the feed line $L_4$ can be provided in the regenerator 1008.

Meanwhile, in the respective channels 120 of the respective reboilers 100, the low-pressure steam 1031 enters into the upper part of the channel from a steam inlet nozzle 121, passes through the plurality of U-shaped heat-transfer tubes, applies heat to the $CO_2$ absorbent that comes in contact with a tube barrel to condense the $CO_2$ absorbent, and returns to a lower side of a partition plate 122. The condensed water 1035 is discharged to outside through a condensed-water outlet nozzle 123.

The $CO_2$ absorbent introduced into the internal shell 101 is heat-exchanged with steam flowing in the respective U-shaped heat-transfer tubes of the heat-transfer tube 103, starts to boil while moving upward outside the respective U-shaped tubes, and moves upward at an accelerated pace to generate steam S. The $CO_2$ absorbent condensed due to generation of the steam S overflows from an upper end of the internal shell 101 and flows down in a passage 132 toward the bottom of the regenerator 1008 and is accumulated therein. The condensed and regenerated $CO_2$ absorbent is extracted from a bottom outlet 1008b, and is fed to the absorber 1006 as the lean solution 1009 via the line $L_2$. On the other hand, the generated steam S passes through the chimney tray 110 and moves upward in the regenerator 1008. Reference numeral 133 denotes a liquid level of the $CO_2$ absorbent. The liquid level 133 is controlled by a liquid-level meter (not shown).

As described above, according to the present invention, the internal shell 101 is provided in the regenerator 1008, and the reboiler 100 including the heat-transfer tube 103 is inserted therein so that the heat-transfer tube 103 is soaked in the $CO_2$ absorbent in the internal shell 101. The heat-transfer tube 103 is efficiently arranged in the horizontal direction, so that a channel for covering the heat-transfer tube required in a conventional reboiler can be eliminated.

Further, in the regenerator 1008 according to the present invention, the regenerated $CO_2$ absorbent to be fed to the internal shell 101 is fed to the absorbent feed headers 114 in the lower part of the internal shell 101 from the seal pan 111 in the upper part via the line $L_4$. The regenerated $CO_2$ absorbent is boiled due to heating of the heat-transfer tube 103, generates the steam S while moving upward in the reboiler 100, and is condensed. The condensed $CO_2$ absorbent is caused to overflow, and passes through the passage 132 formed between a wall surface 1008a of the regenerator 1008 and a wall surface 101a of the internal shell 101 to return to the bottom of the regenerator, thereby establishing a simplified reboiling system.

Figure 7:
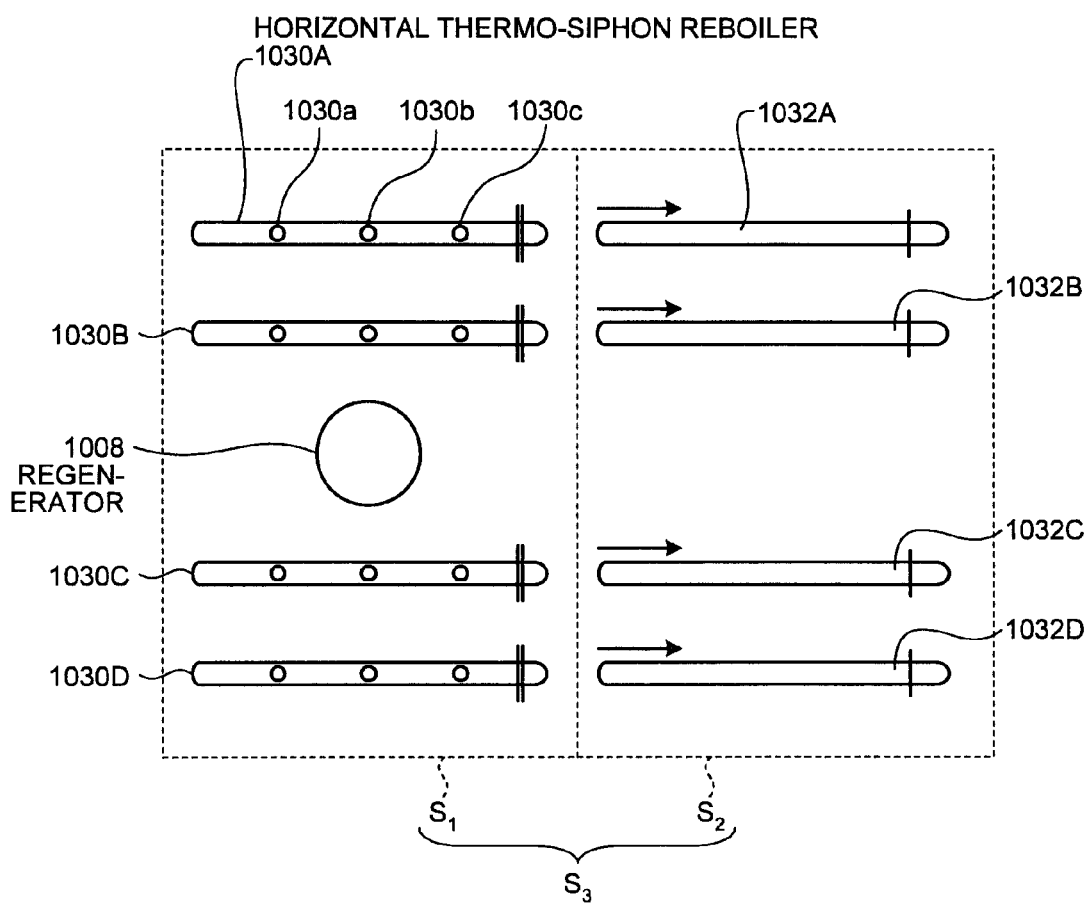
FIG. 7 is a pattern diagram of a site area of a reboiler shown in FIG. 6.

That is, in the conventional system shown in FIG. 7, many (for example, four) reboilers are arranged around the regenerator 1008, and a piping needs to be designed so that the $CO_2$ absorbent is evenly fed to these reboilers, and mixed-phase flow of the reboiled $CO_2$ absorbent and steam is evenly returned to the regenerator 1008. On the other hand, according to the present invention, the internal shell 101 is provided inside the regenerator 1008, and the reboiler 100 including the heat-transfer tube 103 that reboils the $CO_2$ absorbent is installed inside the internal shell 101. Accordingly, the steam S is generated while the $CO_2$ absorbent moves upward in the heat-transfer tube 103 of the reboiler 100, and the $CO_2$ absorbent condensed by separating the steam S overflows and returns to the bottom of the regenerator 1008. The generated steam S moves upward in the regenerator 1008 as it is. Therefore, it is possible to configure that any complicated piping such as a return piping to the regenerator for the mixed-phase flow of the absorbent and steam is not required.

Further, scales adhering to outside of the heat-transfer tube need to be removed regularly. However, a maintenance worker can enter into the regenerator to clean the heat-transfer tube, without extracting the large heat-transfer tube to outside of the shell for cleaning as in the conventional reboiler, thereby enabling to perform the cleaning operation in a short period of time and with less cost.

The reboiler 100 in the regenerator 1008 according to the present invention is cleaned according to the following manner. First, at the time of periodical plant shut down (or periodical check), absorbent on the bottom of the regenerator 1008 and inside the internal shell 101 is discharged from a drain 101b and a bottom outlet 1008b provided at the bottom to the outside. Next, a maintenance worker enters into the regenerator 1008 from a manhole 130 provided on the side of the body of the regenerator 1008 with a cleaning hose, and passes through a baffle plate (works as a platform) 131 to perform cleaning of the U-shaped heat-transfer tubes (tube bundle). As a result, cleaning can be performed without extracting the heat-transfer tube to outside as in the conventional technique. As a result, only the maintenance worker is engaged with the cleaning operation, and a long (for example, about 10 to 15 meters) and heavy (for example, about 30 to 80 tons/tube) tube bundle does not need to be extracted by using a large heavy machine as in the conventional technique, thereby considerably improving working processing and workability at the time of cleaning. In the present embodiment, two manholes 130 are provided on the wall surface of the regenerator 1008 in the upper part of the internal shell 101 to facilitate an access to the heat-transfer tube 13. However, the number of manholes is not limited thereto.

That is, at the time of periodical plant shut down (or periodical check), a worker enters into the regenerator 1008 from the manhole 130 with a cleaning hose, and passes through the baffle plate 131, which also works as a platform, to remove scales adhering to the outer surface of the U-shaped tubes constituting the heat-transfer tube. A ladder (not shown) is provided inside the regenerator 1008, so that the worker can go around and clean all the heat-transfer tubes. Because the size of the heat-transfer tubes 103 arranged vertically is made the same, the workability of maintenance workers is improved.

At the time of extracting the $CO_2$ absorbent from the drain 101b provided at the bottom of the internal shell 101, at least one safety valve is provided near the bottom of the internal shell 101, so that the absorbent left in the internal shell can be promptly discharged, in order to prevent that the inside of the bottom of the regenerator becomes empty and the absorbent is left in the internal shell 101. At the time of emergency, the absorbent having remained therein is quickly discharged.

As described above, according to the present invention, in the reboiling system that generates steam required for performing a regeneration process of $CO_2$ absorbent having absorbed carbon dioxide, for example, of a carbon dioxide capture plant, the internal shell 101 is provided in the regenerator 1008, the reboiler 100 is installed in the internal shell 101, the low-pressure steam 1031 is introduced into the heat-transfer tube 103 of the reboiler 100, the steam S is generated by heating and boiling the regenerated $CO_2$ absorbent, and $CO_2$ having remained slightly in the internal shell 101 is discharged together with the steam S. On the other hand, the $CO_2$ absorbent condensed by releasing steam and remained $CO_2$ overflows from the upper end of the internal shell 101 toward the wall surface of the regenerator 1008, flows downward in the regenerator 1008 through the passage 132, and is temporarily accumulated therein. Thereafter, the $CO_2$ absorbent is extracted from the bottom outlet 1008b, and is fed to the absorber 1006 as the lean solution 1009 via the line $L_2$. As described above, according to the present invention, in the regenerator 1008, a simplified reboiling system incorporated in a regenerator, which constitutes a series of reboiling cycles, can be established in the regenerator 1008.

In the present embodiment, an example in which a plurality of (six in the present embodiment) reboilers 100A to 100F respectively including heat-transfer tubes 103A to 103F are installed in the internal shell 101 is explained. However, the present invention is not limited thereto, and one reboiler including a heat-transfer tube can be inserted and installed in the internal shell according to the size of the recovering apparatus to reboil the $CO_2$ absorbent.

Industrial Applicability

As described above, according to the system and method for recovering carbon dioxide from flue gas of present invention, internal shells are provided inside a regenerator, and a reboiler including a heat-transfer tube is installed in the internal shells, thereby enabling to constitute a simplified reboiling system incorporated in a regenerator, which establishes a series of reboiling cycles.

REFERENCE SIGNS LIST 101 internal shell
102 feeding unit
103 heat-transfer tube
1100 system for recovering carbon dioxide from flue gas
1001 industrial facility (boiler facility or the like)
1006 absorber
1007 $CO_2$ absorbent having absorbed $CO_2$ (rich solution)
1008 regenerator
1009 regenerated $CO_2$ absorbent (lean solution)
S steam

The invention claimed is:

1. A system for recovering carbon dioxide from flue gas, comprising:
   an absorber that brings $CO_2$ absorbent that absorbs $CO_2$ contained in flue gas discharged from a boiler plant into contact with the flue gas to remove $CO_2$ from the flue gas;
   a regenerator that strips $CO_2$ from $CO_2$ absorbent that is fed from the absorber and has absorbed the $CO_2$ to regenerate the $CO_2$ absorbent;
   a plurality of internal shells provided at a bottom of the regenerator with a predetermined interval therebetween, into which regenerated $CO_2$ absorbent is introduced by a feeding unit from a bottom side thereof so that the $CO_2$ absorbent overflows from an upper end of the internal shell thereof toward the bottom of the regenerator; and
   a reboiler that is inserted into the internal shell in a direction orthogonal to a vertical axis and includes a heat-transfer tube that reboils $CO_2$ absorbent, wherein
   the system transfers steam separated from $CO_2$ absorbent reboiled by the heat-transfer tube to an upper part of the regenerator, and
   the system causes condensed $CO_2$ absorbent to overflow from the upper end of the internal shell and to be discharged from a bottom side of the regenerator, and feeds the $CO_2$ absorbent to the absorber as regenerated $CO_2$ absorbent.

2. The system for recovering carbon dioxide from flue gas according to claim 1, wherein two or more of reboilers are inserted alternatively from right and left.

3. The system for recovering carbon dioxide from flue gas according to claim 1, wherein the heat-transfer tube is provided with a reinforcement member.

4. The system for recovering carbon dioxide from flue gas according to claim 1, wherein the heat-transfer tube is constituted by a tube bundle having a rectangular shape in cross section.

* * * * *